Oct. 18, 1949.  J. Y. COUSTEAU ET AL  2,485,039
DIVING UNIT

Filed March 10, 1947  3 Sheets-Sheet 1

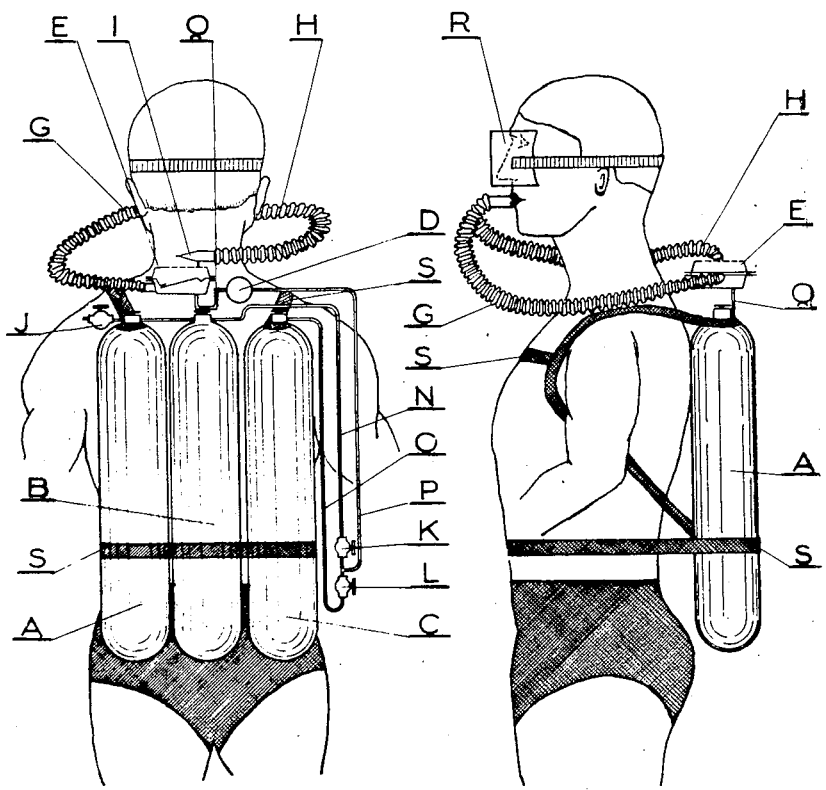

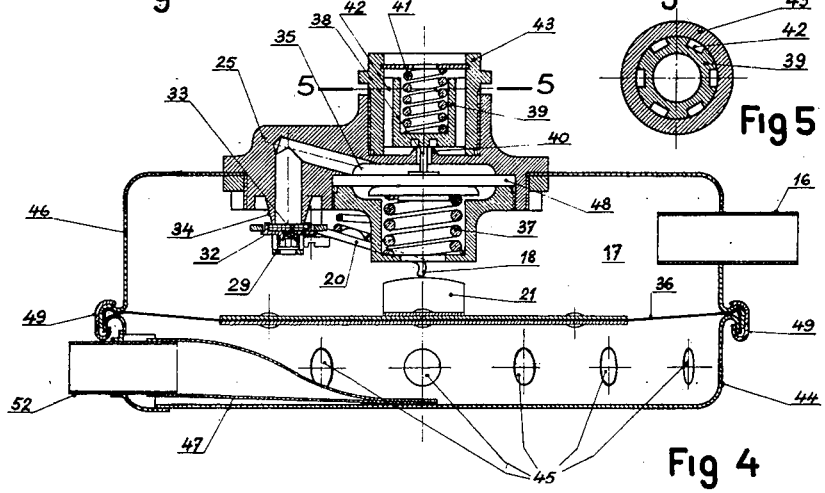

Patented Oct. 18, 1949

2,485,039

UNITED STATES PATENT OFFICE 2,485,039

DIVING UNIT

Jacques Yves Cousteau and Emile Gagnan, Paris, France

Application March 10, 1947, Serial No. 733,658
In France July 8, 1943

Section 1, Public Law 690, August 8, 1946
Patent expires July 8, 1963

5 Claims. (Cl. 128—145)

The present invention relates to improvements in open circuit respiratory apparatus for divers, that is, apparatus in which the gas breathed out by the diver is not re-used. In such installations the diver breathes through a mouthpiece which is maintained in position, for example, by a resilient collar (or any similar device) tightly held by the diver in his mouth, and through which the gas to be breathed is admitted, the expired gas being expelled into the water. In the said apparatus, the breathable gas is supplied under a certain pressure, but only reaches the diver through the medium of a pressure reducing valve the diaphragm of which is subjected to the pressure of the water under which the diver operates.

One object of this invention is to feed the diver only the quantity of gas necessary to normal breathing and to avoid the loss of breathable gas which takes place in diving units in which the gas is supplied in a continuous manner. A further object is to automatically bring about pressure equilibrium between the gas inspired and the surrounding water. Another object is to enable the diver to take up all possible positions without incurring the risk of the reducing valve opening otherwise than as a result of his inspirations. Still another object is to render the diver autonomous, that is, independent of any fixed supply of breathing gas, lying either above or below the level of the water. Further objects of the invention will appear from the following description.

Figure 1:
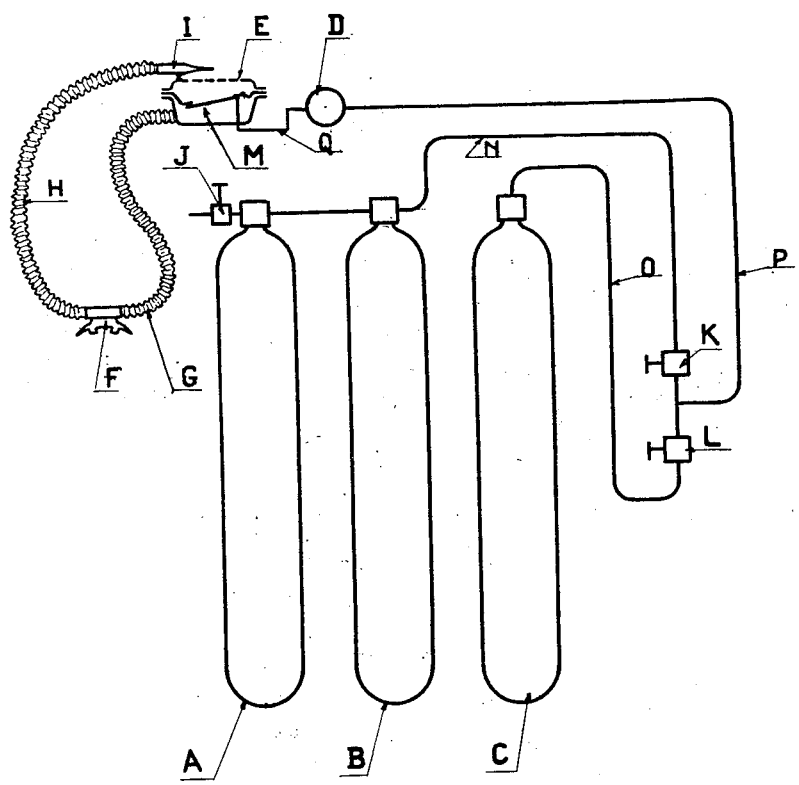
Figure 1A:
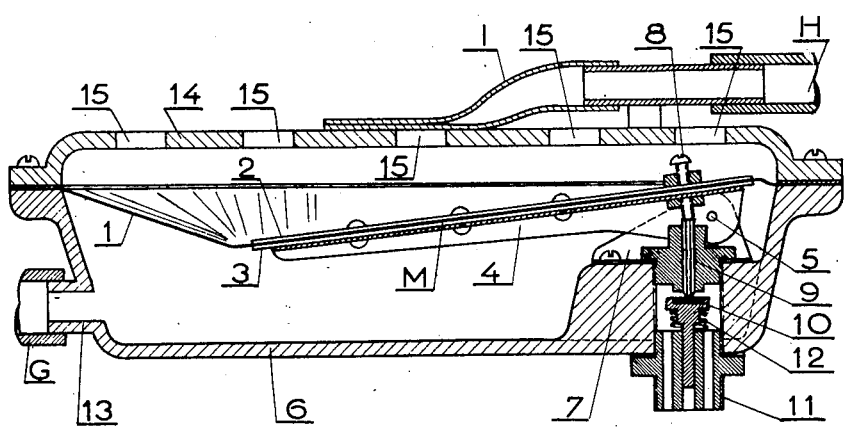

The invention will now be described with reference to the accompanying drawing, in which:

Fig. 1 is a diagrammatic view showing the several elements of which the diving unit is composed, Fig. 1a is a sectional elevation of the low pressure regulator which is a part of said unit, Fig. 2 is a back view of a diver wearing the diving unit, Fig. 3 is a side view of the same diver, Fig. 4 is a sectional elevation of another form of pressure regulator which may be utilized, Fig. 5 is a cross section taken along line 5—5 of Fig. 4, Fig. 6 is a plan view of a part of the pressure regulator shown in Fig. 4, Fig. 7 is at the same time an enlarged view of a portion of Fig. 4 and an enlarged section taken along line 7—7 of Fig. 6, Fig. 8 is a cross section taken along line 8—8 of Fig. 6, Fig. 9 is a cross section taken along line 9—9 of Fig. 6, Fig. 10 is a portion of Fig. 4, showing a part of the regulator, and Fig. 11 is a front view of said part.

Referring to Figs. 1, 2 and 3, A and B are two cylinders containing compressed air but which might as well be filled with any other compressed breathable gas. On the cylinder A is mounted a cock J through which the compressed air is admitted to the two cylinders for the purpose of filling them. The air inhaled by the diver is withdrawn from the cylinders through a common pipe N. A third cylinder C serves as a reserve; the gas contained in it being available for the diver when he feels that the supply of gas contained in the two cylinders A and B is close to being exhausted. The capacity of this third cylinder is sufficiently large to supply sufficient air to the diver to enable him to rise to the surface sufficiently slowly. The diver can thus dispense with any instruments for measuring the pressure in the two cylinders A and B. The air is withdrawn from the reserve cylinder C through a pipe O. Pipes N and O are provided with cocks K and L, respectively, which are operated by the diver. While two cylinders A and B have been shown for the normal supply of air to the diver, only one could be utilized instead.

The air which has passed through one of the cocks, K or L as the case may be, flows through the pipe P and thence through a first pressure-reducing valve or regulator D, which delivers it under a predetermined pressure of a few, for instance two, kilograms per square centimeter in excess of that of the surrounding media. The air then flows through pipe Q to a second pressure regulator shown generally at E, and on a larger scale in cross section in Fig. 1a.

The second regulator E is a depression one, that is, it operates under the action of the depression of a diaphragm caused by the diver's inspiration. Generally speaking, a regulator allows the downward (or utilization) pressure to remain constant as the cylinder empties and therefore the upward (or cylinder) pressure decreases. To this end it comprises a resilient diaphragm, the outward face of which constantly is subjected to the pressure of the surrounding medium, the inward face being subjected to the downward pressure. As the low pressure gas is being consumed, the downward pressure tends to decrease, resulting in a deflection of the diaphragm, but the same is suitably connected with the valve member through which the compressed gas is expanded, resulting in an opening of this valve member, thus restoring and keeping constant the downward pressure. The regulator shown in Fig. 1a is of the same type as that described in Swiss Patent No. 234,418 granted on the invention of one of the inventors of the present diving unit, but it might as well be of any other conventional type, inasmuch as the mechanism through which the deflection of the resilient diaphragm controls the opening of the valve member is quite immaterial in the present invention.

As stated in said patent: the conventional resilient diaphragm 1, for example of rubber fabric and of a rectangular shape, is held, for the most part, between two plates 2 and 3 of metal or plastic material, the lower plate being fastened to a U-shaped lever 4 pivoted on an axis 5 secured to the casing 6 by means of two supports 7. A leakage-free screw 8 passes through the plates 2 and 3 and bears on the rod 9 of triangular section. This rod operates the valve member 10, made of rubber for instance, which is placed in the gas inlet nipple 11 and normally is pressed to its closed position by a weakly acting spring 12. The expanded gas leaves the expansion valve casing through a pipe 13. The casing 6 has a cover 14 provided with orifices 15 through which the surrounding water may pass to act directly on the upper side of the diaphragm 1. Each of the diver's inspirations reduces the pressure in the chamber beneath the diaphragm and thereby causes a downward movement of the diaphragm and the opening of the valve member 10, the valve member 10 closing again at the end of the inspiration. In this manner, the diver is only fed the quantity of gas necessary to normal breathing, and no loss of breathable gas occurs, as, on the contrary, takes place in installations where the gas is supplied in a continuous manner. As the diaphragm 1 of the valve E, which preferably is positioned on the diver in the neighborhood of his lungs, is subjected to the pressure of the water under which the diver operates, the breathable gas reaches the diver, after the breath taken in by him has opened the valve member 10, under the desired pressure. In this manner pressure equilibrium automatically is maintained between the gas inspired and the surrounding water.

Referring to Figs. 1, 2 and 3 again, the expanded air issuing from the low pressure regulator E passes into an inlet hose G and thence reaches a mouthpiece F. The air is breathed in by the diver through this mouthpiece and again expelled through it. The expelled air flows through the outlet hose H, which ends with a flap valve I comprising, for example, as in certain known breathing apparatus, a flattened india-rubber pipe. The flap valve avoids the introduction of water into the outlet hose H under the effect of the inspirations and preferably should open out, as shown, in the immediate proximity of the diaphragm 1 of the low pressure regulator. In this manner, the diver can assume all possible positions without incurring the risk of the low pressure regulator E opening spontaneously when it stands at a level sufficiently below that of the discharge flap I to do so and thereby result in a waste of breathable gas. In any case, the orifice I through which the expired air is expelled should be positioned at a distance from the center of pressure M of the diaphragm 1 of the low pressure regulator less than the height of a column of water representing the pressure necessary for the operation of this regulator, that is, the opening of its valve member 10.

The diver wears moreover diving goggles R having a single glass, leaving the mouth outside but including the nose in order to obtain a pressure balance behind the glass by means of the air passing through the nostrils.

The gas cylinders along with the piping and regulators are held in place on the diver's back by means of straps S.

The apparatus as a whole is so designed that when the cylinders are empty it has an apparent weight in water which is nil, whether it be in river water or sea water, etc. The weight of the breathable gas which fills the cylinders is compensated for, for example, by releasable floats which may be secured to the belt of the diver and which are released by him one by one as he consumes breathable gas, so as to maintain buoyancy as near to zero as possible. The buoyancy of the diver himself, which is dependent on his breathing capacity and which is about 2 to 3 kgs., is compensated for by a single releasable lead weight, which also may be secured to the belt and designated "safety lead."

For the operation of the unit the three cylinders A, B and C are first filled with compressed air, the cocks K and L being closed. Before sinking, the diver, who wears about him all the apparatus, opens cock K, cock L remaining shut. Under the inspirations of the diver, the valve member 10 of the low pressure regulator E opens by an amount just necessary for the breathing. When the diver feels that his normal supply of air is on the point of being exhausted, he opens the cock L and slowly rises to the surface.

While in the unit hereinabove described the breathable gas is stored in cylinders carried by the diver, it could also be sent to him from the surface by means of a pipe.

While two one-stage pressure regulators D and E have been shown, they may, if desired, be replaced in known manner by one two-stage regulator.

Such a regulator is shown in Figs. 4 to 11.

In this modification the breathable gas is sucked through the pipe 16 as a consequence of the diver's inspiration, the ensuing depression within the chamber 17 resulting in the upward deflection of the resilient diaphragm 36. The two bent ends 18 and 19 of a lever 20 bear on said diaphragm through the medium of a bar 21 against which they are pressed by means of two springs 22. One extremity of the spring embraces a lug 23 formed in the lever 20, the other is housed in a recess 24 formed within the body 25 enclosing the pressure-relieving movable members. The lever 20 has substantially the shape of a crescent, the plane of which has been slightly broken along a line 26. It is pivoted about four small rivets 27 which rest two by two on the inside faces of two stationary screws 28 which are screwed into the body 25. The lever 20 carries in its central part a bridge 29 in which is secured one end of a metal axis 30 the other extremity of which is free. The axis 30 is surrounded at some distance by a rubber cylinder 31, which presses against a metal gasket-holder 32, inside which is inserted the gasket 33. Two diametrically opposed little lugs 35', on which rests the gasket-holder 32, are provided in the lever 20. This mounting allows the gasket some freedom of movement about the extremity of the axis 30 and thus enables it to spontaneously face the right direction so as to lie absolutely tightly all along the contact line of the seat 34. Moreover the small lugs 35' prevent the drawback of an excessive lengthwise play which would result from this freedom of movement.

The upward deflection of the diaphragm 36 results in the pivoting of the lever 20 about the rivets 27 and therefore in the lifting of the gasket 33 off its seat 34. Thus gas flows, through the restricted space between the gasket and its seat, from the chamber 35 (see Fig. 4) to the chamber 17, and is at the same time expanded. The flow of gas from the chamber 35 results in a drop of pressure within said chamber 35 and therefore in the upward deflection of the resilient diaphragm 48 which partially defines this chamber. The pressure inside this chamber, which is for instance of the order of 5 kgs. per square centimeter above that obtaining on the outside face of the diaphragm 48, is balanced by a spring 37. The deflection of the diaphragm 48 provokes, through the medium of a spindle 38, the lifting of the valve member 39 off its seat 40, towards which it is pressed by a spring 41. Gas can therefore flow from the compressed gas cylinders, and be simultaneously expanded. The compressed gas from the cylinders reaches the space between the valve member 39 and the seat 40 through channels 42 hollowed out in the valve member 39, which may slide inside a nipple 43 which is directly connected to the cylinder cock by means of a stirrup not shown.

A cover 44 having apertures 45 is clamped by means of clips 49, two of which are shown, along its circular edge to the casing 46 of the device, and the diaphragm 36 is at the same time squeezed along its circular edge between the casing 46 and the cover 44. The expiration flap valve 47 is lodged within the cover as near as possible to the center of pressure of the diaphragm and thereby protected against any possible damage. The expired air escapes out of the cover through the apertures 45.

A portion of the cover 44 has been cut out and replaced by a removable curved plate 50 (Figs. 10 and 11), which is affixed to the cover by means of two screws 51. A nipple 52 is soldered to the plate 50 and passes therethrough. The hose (not shown) coming from the mouthpiece and through which the expired gas is expelled fits upon the outer end of this nipple, the flap 47 being carried by the inner end. In order to replace the flap, it is sufficient to unscrew the screws 51 and remove the plate 50 without it being necessary to remove the whole of the cover 47.

Other modifications could also be made in the above described apparatus without departing from the spirit of the invention, the scope of which is to be determined only by the following claims in which the word "regulator" designates the last regulator, when two or more are disposed in series, as in Figs. 1, 2 and 3 of the accompanying drawing, and the word "diaphragm" designates the diaphragm of the last stage when only one multi-stage regulator is utilized as in Figs. 4 to 11.

This application is a continuation-in-part of our abandoned application Serial No. 593,954 filed May 15, 1945.

We claim:

1. A breathing apparatus for divers comprising a breathing device, a source of breathable gas, a conduit for conducting gas from the source to the breathing device, a regulator forming a portion of the conduit, said regulator including a valve for controlling the flow of gas through the conduit, a diaphragm and means operatively connecting the valve and the diaphragm, the diaphragm being exposed on one side to the pressure of the surrounding fluid media and on the other side to the pressure of the gas in the regulator, an exhalation valve so positioned that the distance between it and the center of the operative portion of the diaphragm is less than the height of a column of the surrounding fluid media representing the pressure necessary for operating the diaphragm sufficiently to open the regulator valve, and a conduit for conducting expired gas from the breathing device to the exhalation valve.

2. A breathing apparatus as set forth in claim 1 in which the exhalation valve is of the flap type.

3. A breathing apparatus as set forth in claim 1 which includes a cover member removably secured to the regulator over the diaphragm and in which the exhalation valve is fastened to the cover member, the cover member having holes therethrough to allow the passage of surrounding fluid media to the outer side of the diaphragm.

4. A breathing apparatus as set forth in claim 1 which includes a cover member removably secured to the regulator over the diaphragm and in which the exhalation valve is positioned within the cover member, the cover member having holes therethrough to allow the passage of surrounding fluid media to the outer side of the diaphragm.

5. A breathing apparatus as set forth in claim 1 which includes a cover member removably secured to the regulator over the diaphragm, the cover member having a removable portion to which the exhalation valve is secured and having holes therethrough to allow the passage of surrounding fluid media to the outer side of the diaphragm.

JACQUES YVES COUSTEAU.
EMILE GAGNAN.

REFERENCES CITED

The following references are of record in the file of this patent:

UNITED STATES PATENTS

| Number | Name | Date |
| --- | --- | --- |
| 59,529 | Rouquayrol | Nov. 6, 1866 |
| 764,709 | Chapin et al. | July 12, 1904 |
| 2,303,155 | Berge | Nov. 24, 1942 |
| 2,388,674 | Browne | Nov. 13, 1945 |

OTHER REFERENCES

"The Physics and Physiology of Diving," July 20, 1925, page 13. (Photostat Copy in 128—145.)